United States Patent [19]

Mason

[11] Patent Number: 5,740,396
[45] Date of Patent: Apr. 14, 1998

[54] SOLID STATE DISK DEVICE HAVING A FLASH MEMORY ACCESSED BY UTILIZING AN ADDRESS CONVERSION TABLE TO CONVERT SECTOR ADDRESS INFORMATION TO A PHYSICAL BLOCK NUMBER

[75] Inventor: Colin Mason, Tokyo, Japan

[73] Assignee: Mitsubishi Denki Kabushiki Kaisha, Tokyo, Japan

[21] Appl. No.: 598,535

[22] Filed: Feb. 8, 1996

[30] Foreign Application Priority Data

Feb. 16, 1995 [JP] Japan ................................. 7-028287

[51] Int. Cl.$^6$ ................................................. G06F 13/00
[52] U.S. Cl. .................. 395/430; 395/427; 395/497.04; 364/DIG. 1; 365/185.33
[58] Field of Search ........................... 395/427, 497.04, 395/430; 365/185.33

[56] References Cited

U.S. PATENT DOCUMENTS 5,459,850  10/1995  Clay et al. ........................ 395/497.02
5,465,338  11/1995  Clay et al. ........................ 395/310
5,473,765  12/1995  Gibbons et al. .................... 395/500

FOREIGN PATENT DOCUMENTS 0522780  of 1992  European Pat. Off. .

*Primary Examiner*—Frank J. Asta
*Attorney, Agent, or Firm*—Leydig, Voit & Mayer, Ltd.

[57] ABSTRACT

A semiconductor disk device comprising a flash memory having a plurality of blocks, each block constructed of a block information memory area for storing the number of erase cycles of the block, a plurality of data memory areas for storing data, and a logical sector address memory area associated with each of the data memory areas for storing a logical sector address, an address conversion table for converting the logical sector address into a physical block number, and a CPU which converts the logical sector address (LSA) into the physical block number (PBN) according to the address conversion table. The CPU also searches the latest data memory area in the physical block in the flash memory based on the logical sector address and reads the content of the latest data memory area. Thus, a small-capacity address conversion table for memory management results.

16 Claims, 20 Drawing Sheets

FIG. 2

| LSA | PBN |
|---|---|
| 1 | 3 |
| 2 | 3 |
| 3 | 1 |
| ⋮ | ⋮ |
| n−1 | |
| n | |

Figure 15:
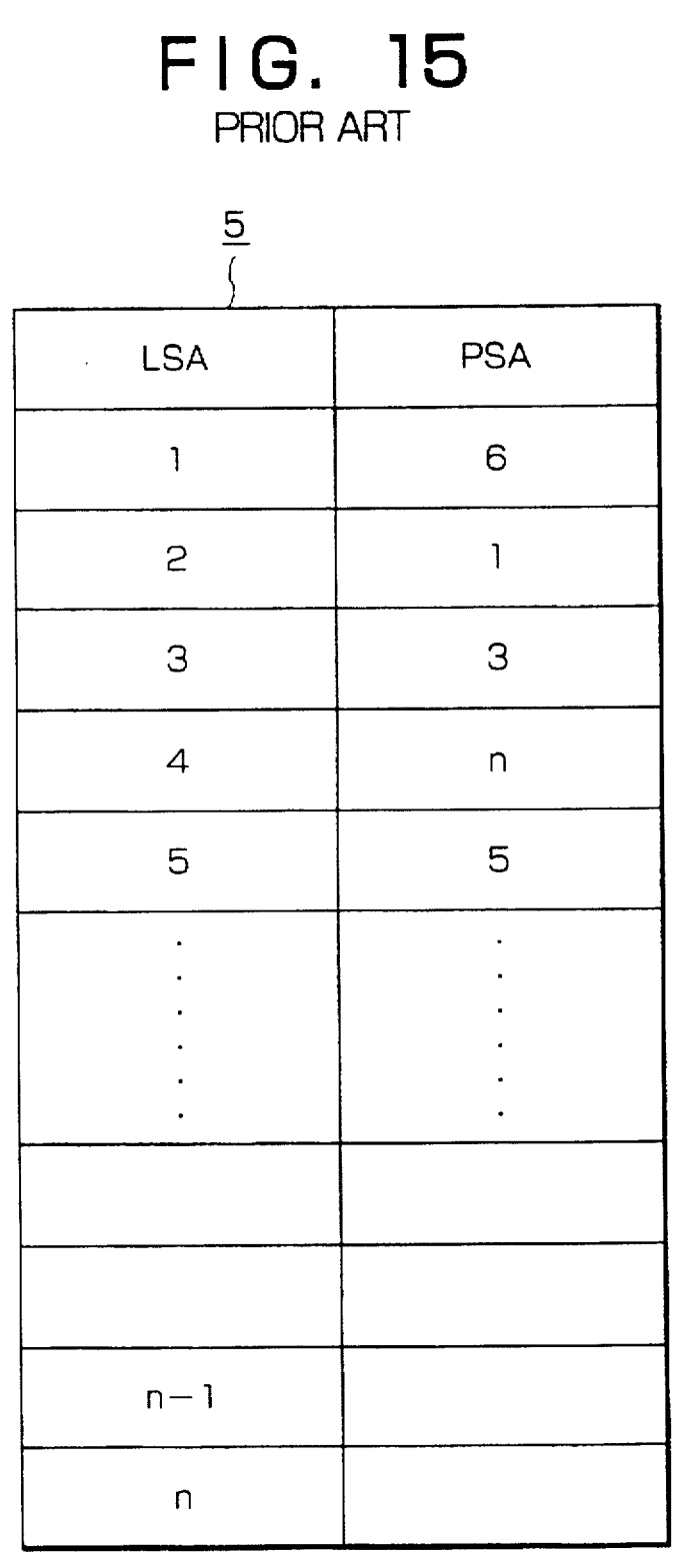

| LSA | PSA |
|---|---|
| 1 | 6 |
| 2 | 1 |
| 3 | 3 |
| 4 | n |
| 5 | 5 |
| ⋮ | ⋮ |
|  |  |
|  |  |
| n−1 |  |
| n |  |

Table 5:

| LSA | PSA |
|-----|-----|
| 1 | 1 |
| 2 | 3 |
| 3 | 7 |
| 4 | 4 |
| 5 | |
| 6 | |
| 7 | |
| 8 | |
| 9 | |
| 10 | |
| 11 | |
| 12 | |

Block 8 containing blocks 9:
- 1: A 1, 2: , 3: B 2
- 4: D 4, 5: , 6:
- 7: C 3, 8: , 9:
- 10: , 11: , 12:

FIG. 20
PRIOR ART

SOLID STATE DISK DEVICE HAVING A FLASH MEMORY ACCESSED BY UTILIZING AN ADDRESS CONVERSION TABLE TO CONVERT SECTOR ADDRESS INFORMATION TO A PHYSICAL BLOCK NUMBER

BACKGROUND OF THE INVENTION

1. Field of the Invention

The present invention relates to a semiconductor disk device such as a semiconductor disk card that uses a flash memory as its storage medium.

2. Description of the Related Art

In the personal computer field, today, magnetic storage media such as hard disks are in widespread use to store a relatively large amount of data. Although the power consumption of the hard disk drive is large, it offers an excellent cost performance.

Semiconductor disk drive apparatuses have been introduced which drive a semiconductor memory such as a flash memory like the hard disk drive apparatus drives a hard disk. Unlike the hard disk drive, the semiconductor disk drive contains no mechanical parts such as a motor. Although the semiconductor disk device is outperformed by the magnetic storage medium system in terms of cost, the semiconductor disk device presents advantages in power consumption and reliability over the magnetic storage system. Thus, the demand for the semiconductor disk device is growing, in particular, in the portable information terminal field.

Flash memory has the following features. First, flash memory is a non-volatile memory electronically programmable and erasable. Second, flash memory accepts no data overwriting on a memory cell that is already programmed with data (thus, a programming operation is always associated with an erasing operation). Third, the unit of erasing ranges from a few K bytes to tens of K bytes. Fourth, there is a limitation on the number of program/erase cycles which may be performed during the life of a memory cell.

Referring to FIGS. 14 through 17, a prior art semiconductor disk device is discussed. FIGS. 14 through 17 show the known semiconductor disk device disclosed in Japanese Patent Laid-open No. 5-27924. FIG. 14 is a block diagram showing generally the prior art semiconductor disk device. FIG. 15 shows the internal construction of an address conversion table of the device of FIG. 14. FIG. 16 shows the internal construction of the flash memory of the device of FIG. 14. FIG. 17 shows the internal construction of the block of the flash memory of FIG. 16. The identical or similar parts are designated by the same reference numerals throughout the figures.

As shown in FIG. 14, the prior art semiconductor disk device 2 comprises an interlace circuit 3, a CPU 4, an address conversion table 5, a flash control circuit 6, a data input/output sector buffer 7, and a flash memory 8. The CPU 4 is constructed of MCU, ROM, RAM, I/O ports and the like.

The host system 1 that is connected to the semiconductor disk device 2 is typically a notebook computer or a portable information terminal. Most of the removable semiconductor disk devices 2 are currently of an encased card exchangeable type. The interface circuit 3 performs information exchange with the host system 1. The CPU 4 controls data input and output and issues instructions to the flash memory 8.

The logical sector/physical sector address conversion table 5 is a table that converts a logical sector address (LSA) into a physical sector address (PSA). LSA is a sector address the host system 1 specifies to the semiconductor disk device 2. PSA is an address in the flash memory 8 used in the semiconductor disk device 2.

The flash control circuit 6 performs simple data processing for the flash memory 8. For example, simple data exchange is accomplished by the flash control circuit 6, and the rest of the processing is accomplished by CPU 4. The data input/output buffer 7 is used to output data from the flash memory 8 through the interface circuit 3 or input data through the interface circuit 3 into the flash memory 8.

In FIG. 15, the address conversion table 5 is constructed of an LSA storage section and a PSA storage section.

The LSA storage section stores the logical sector addresses. Their contents are fixed. In practice, when a logical sector address is sent from the host system 1, voltages are applied to the address pins of a volatile RAM containing the conversion table according to the LSA data, and the applicable PSA data is then output. For convenience of explanation, it is presumed that the LSA storage section is arranged corresponding to the PSA storage section. The PSA storage section stores arbitrary sector numbers (1 through n) for the flash memory 8. The use of the address conversion table 5 allows data to be written on the physical sector addresses in a way convenient for internal data management, without the need to pay attention to the logical address specified by the host system 1. The address conversion table 5 is typically constructed of an SRAM or DRAM because it is frequently programmed and erased.

The capacity of the address conversion table 5 is determined as follows. Assuming that a flash memory 8 of 20 megabytes capacity is used and that the unit of data for input and output (sector) is 512 bytes, the number of sectors in the semiconductor disk device 2 is calculated as follows:

Number of sectors in the semiconductor disk device=20 megabytes/512 bytes=40960 sectors.

The number of bits required to express 40960 in binary is as follows:

ln 40960/ln 2=15.3

To express 40960, 16 bits are required.

The necessary capacity of the address conversion table 5 is 40960×16=655360 bits. In conclusion, the necessary capacity is 80 kilobytes.

In FIG. 16, the flash memory 8 is constructed of a plurality of blocks 9 and a plurality of backup blocks 9.

The flash memory 8 is a non-volatile memory electronically programmable and erasable. Because of its non-volatility, the flash memory 8 requires no backup battery, unlike DRAM and SRAM. Since the flash memory 8 can be electronically erased, data modification is performed without detaching the flash memory 8 from its board, unlike EPROM. Since a single transistor cell stores one bit of data, the manufacturing cost required is lower than that for an EEPROM. These are advantages of the flash memory 8. Its disadvantages: the maximum erase cycles permitted for a cell is somewhere between 100000 and one million times; each write operation must be associated with an erase operation (no data overwriting onto a cell that has already stored data is permitted); and the erasing operation is performed by block and the block, namely, the unit of erasing, ranges from a few kilobytes to tens of kilobytes, for example 64 kilobytes.

As shown in FIG. 17, each block 9 has a block information memory area 10 on its header, a plurality of data memory areas 11 and a plurality of LSA memory areas 12.

The block information memory area 10 stores the current block erase count. Each of the data memory areas 11 is typically 512 bytes (=one sector) in size. Each sector is associated with an LSA memory area 12. When writing data, the LSA memory area 12 stores the LSA specified by the host system 1. If the logical sector/physical sector address conversion table 5 is made of volatile RAM, data will be lost when power is cut off. When power is reapplied, the RAM table 5 is reconstructed by searching for all the LSA information applicable to each PSA as stored in the LSA memory areas 12.

Referring to FIGS. 18, 19, and 20, the operation of the prior art semiconductor disk device is discussed. FIG. 18 is an explanatory diagram showing the read operation by the prior art semiconductor disk device. FIGS. 19 and 20 are explanatory diagrams showing the write operation by the prior art semiconductor disk device.

Unlike the hard disk system, the semiconductor disk device 2 employing the flash memory 8 is unable to overwrite data. Thus, the volatile RAM stores the address conversion table 5 that indicates the logical sector address of the data sent from the host system 1 and which physical address in the flash memory 8 is used for storage of the data. The use of the table 5 permits an efficient use of the memory areas of the flash memory 8.

Referring to FIG. 18, the data read operation of the semiconductor disk device 2 is discussed. The host system 1 sends to the semiconductor disk device 2 the sector address of the data to be read. The address data sent from the host system 1 can be arranged in one of two formats: LSA and CHS. The LSA format specifies each sector by a serial number from 1 through n. The CHS format specifies each data area by a combination of three data, namely, of a cylinder, a head and a sector as used in the hard disk system. The semiconductor disk device 2 employs the LSA/PSA address conversion table 5. When the host system 1 sends the CHS formatted data, the interface circuit 3 converts it into LSA formatted data before the next processing step.

The CPU 4 converts the LSA specified by the host system 1 into the PSA, by referring to the address conversion table 5. Finally, the data corresponding to the PSA is read from the flash memory 8.

When the LSA specified by the host system 1 is 2, for example, the address conversion table 5 converts it into a PSA of 6. Accordingly, as shown in FIG. 18, the data, A, is read. The LSA memory area 12 stores 2 as A's LSA.

The write operation of the semiconductor disk device 2 is discussed referring to FIGS. 19 and 20. Suppose that data, A, B, and C are stored, respectively, in PSAs 1, 3, and 7 in the initial condition of the device. It should be noted that the flash memory 8 permits no data overwriting in its write operation. For the above initial condition, PSAs 1, 3 and 7 are prohibited from overwriting.

When the host system 1 specifies an LSA with no data written, CPU 4 writes data on any appropriate empty area (PSAs 2, 4 through 6, and 8 through 12), and updates the data in the address conversion table 5. FIG. 19 shows that the host system 1 gives the instruction to write data D to LSA 4. Data D and the LSA specified by the host system 1 are written to PSA 4, and the PSA, 4, is written to the address corresponding to LSA 4 in the address conversion table 5.

When the host system 1 gives the instruction to write to an area already containing data (for example, writing is attempted with a file name which already exists), the data to be written is written onto an empty area in the flash memory 8, and the address conversion table 5 is updated. FIG. 20 shows the result of the over-writing is LSA 2. Update data B' is written to the empty PSA 5, and the PSA area corresponding to LSA 2 in the address conversion table 5 is changed to 5. The CPU 4 in the card will know that the data stored at PSA 3 is no longer valid.

SUMMARY OF THE INVENTION

In the above described semiconductor disk device, the address conversion table 5 needs sufficient memory area for storing a single PSA for each sector (the unit of data for data management). As the capacity of the flash memory 8 increases, the capacity of the address conversion table 5 must increase accordingly.

The present invention has been developed to solve the above problem, and it is an object of the present invention to provide a semiconductor disk device that features a reduced capacity address conversion table for memory management while still keeping the performance of the prior art device, namely maintaining a read rate approximately as high as the read rate achieved by the prior art device.

The semiconductor disk device according to the present invention comprises a non-volatile, electronically programmable and erasable flash memory that is erased in block units, interface means for exchanging data and address with an external system, an address conversion table for converting sector address information into a physical block number, and access means for converting the sector address information input from the external system into the physical block number referring to the address conversion table, and for accessing the flash memory according to the physical block number.

As a result, a reduced address conversion table for memory management is provided.

BRIEF DESCRIPTION OF THE DRAWINGS

FIG. 2 is shows the construction of the address conversion table according to the embodiment of the present invention, FIG. 15 shows the construction of the address conversion table of the prior art semiconductor disk device.

FIG. 19 shows the data write operation of the prior art semiconductor disk device.

Figure 20:
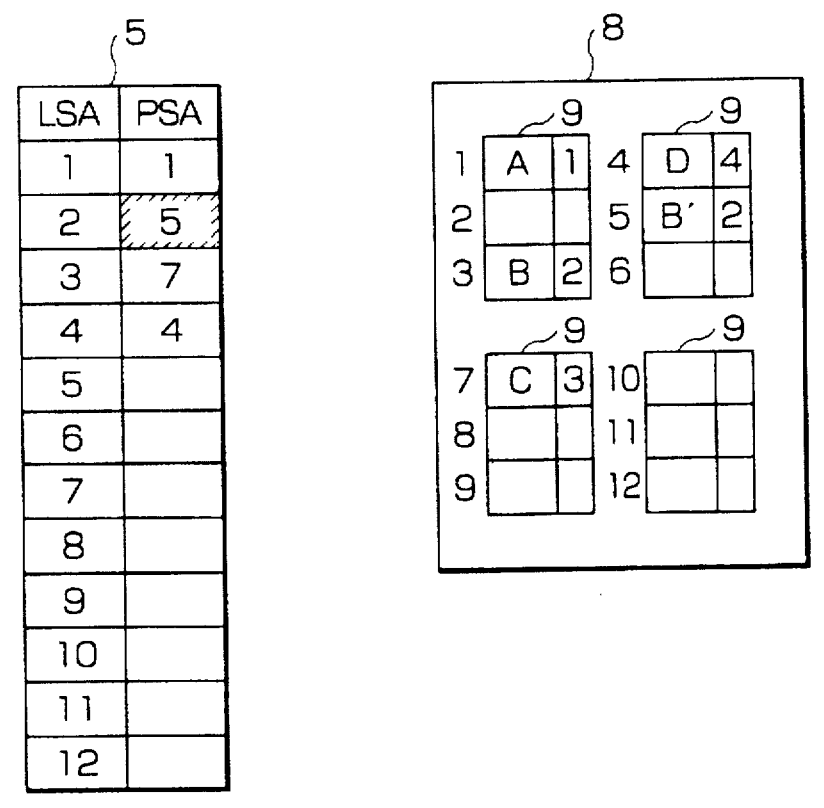

FIG. 20 shows the data write operation of the prior art semiconductor disk device.

DESCRIPTION OF THE PREFERRED EMBODIMENT

Figure 1:
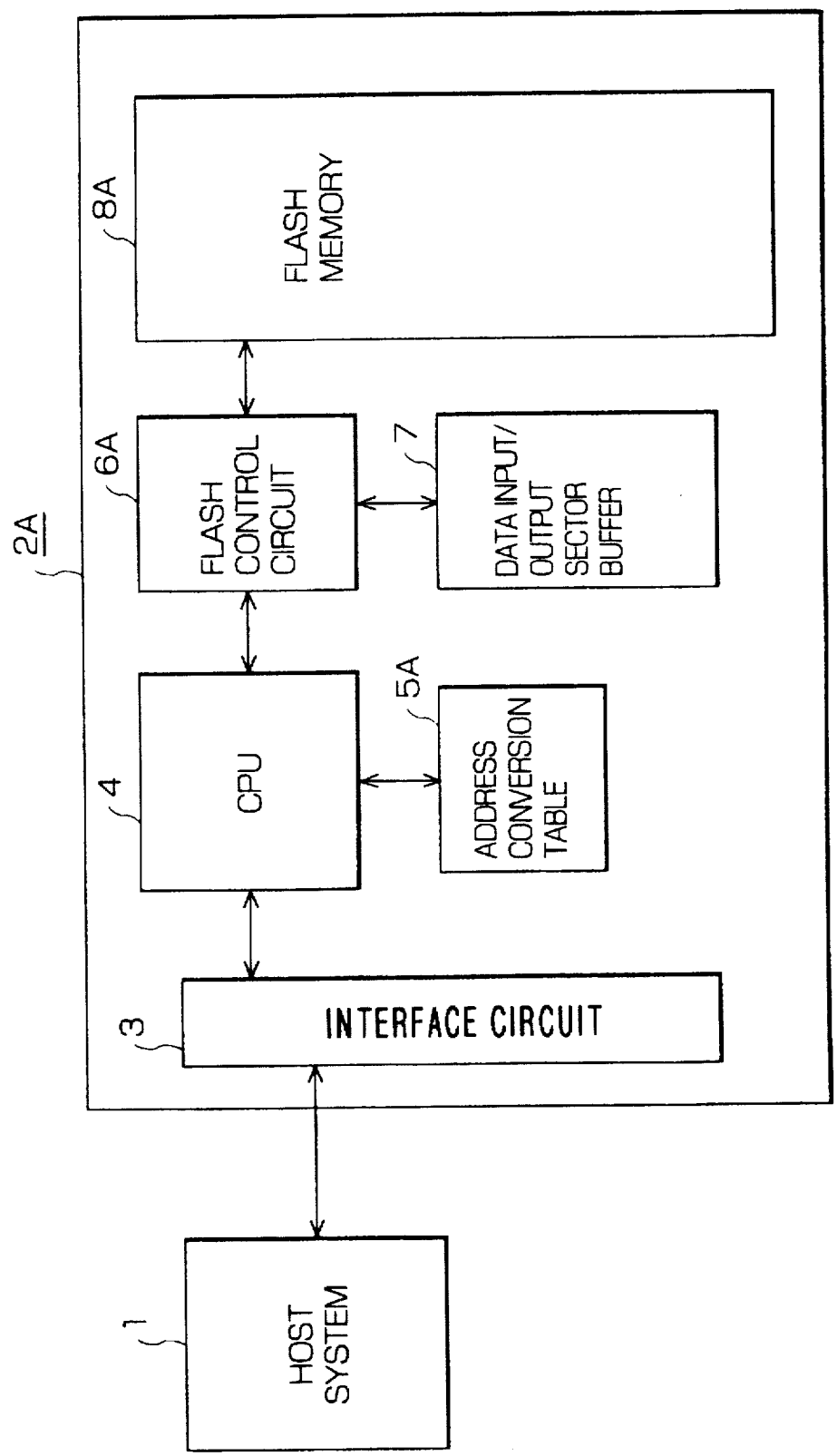
FIG. 1 is a block diagram showing generally the construction of an embodiment of the present invention.
Figure 2:
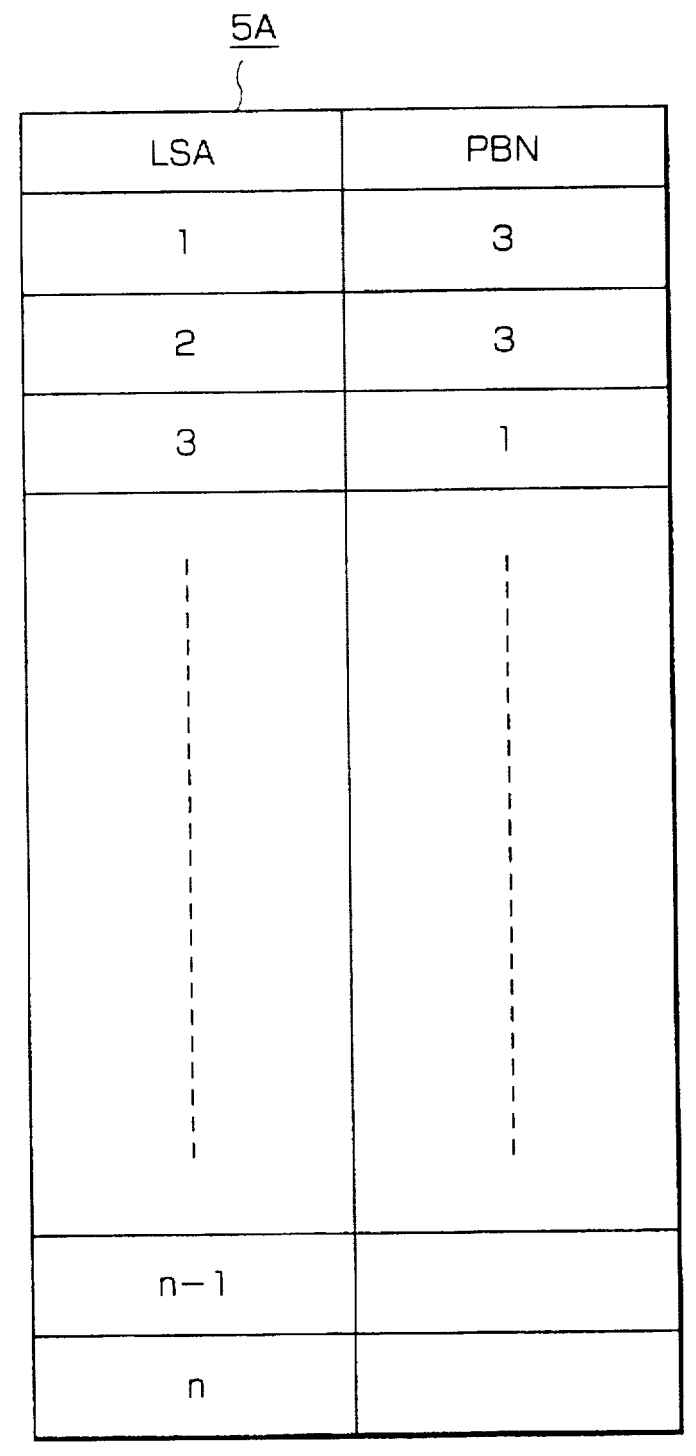
Figure 3:
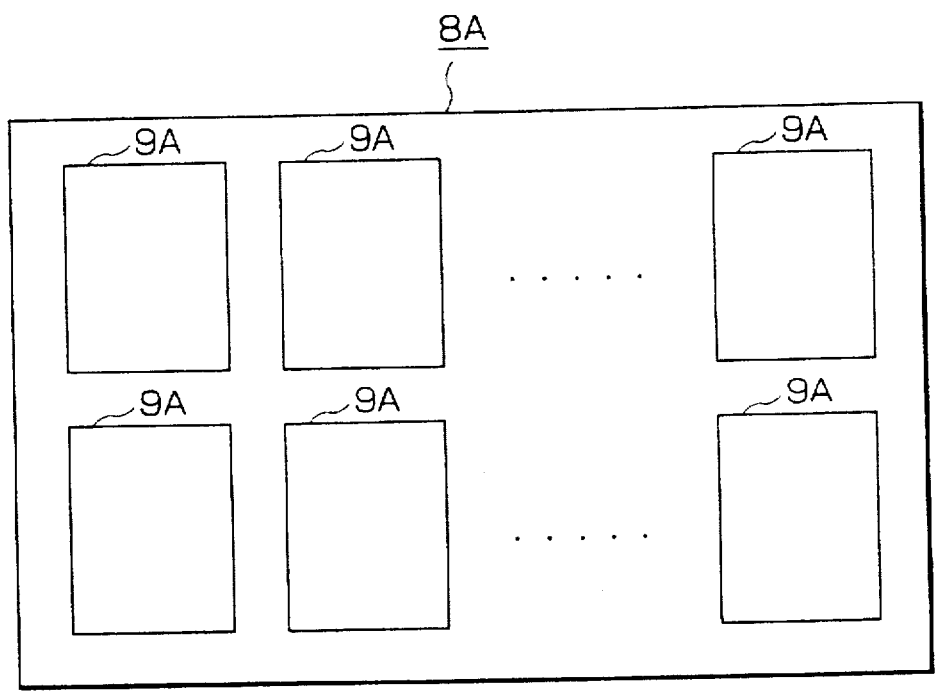
FIG. 3 is shows the internal construction of the flash memory of the embodiment of the present invention.
Figure 4:
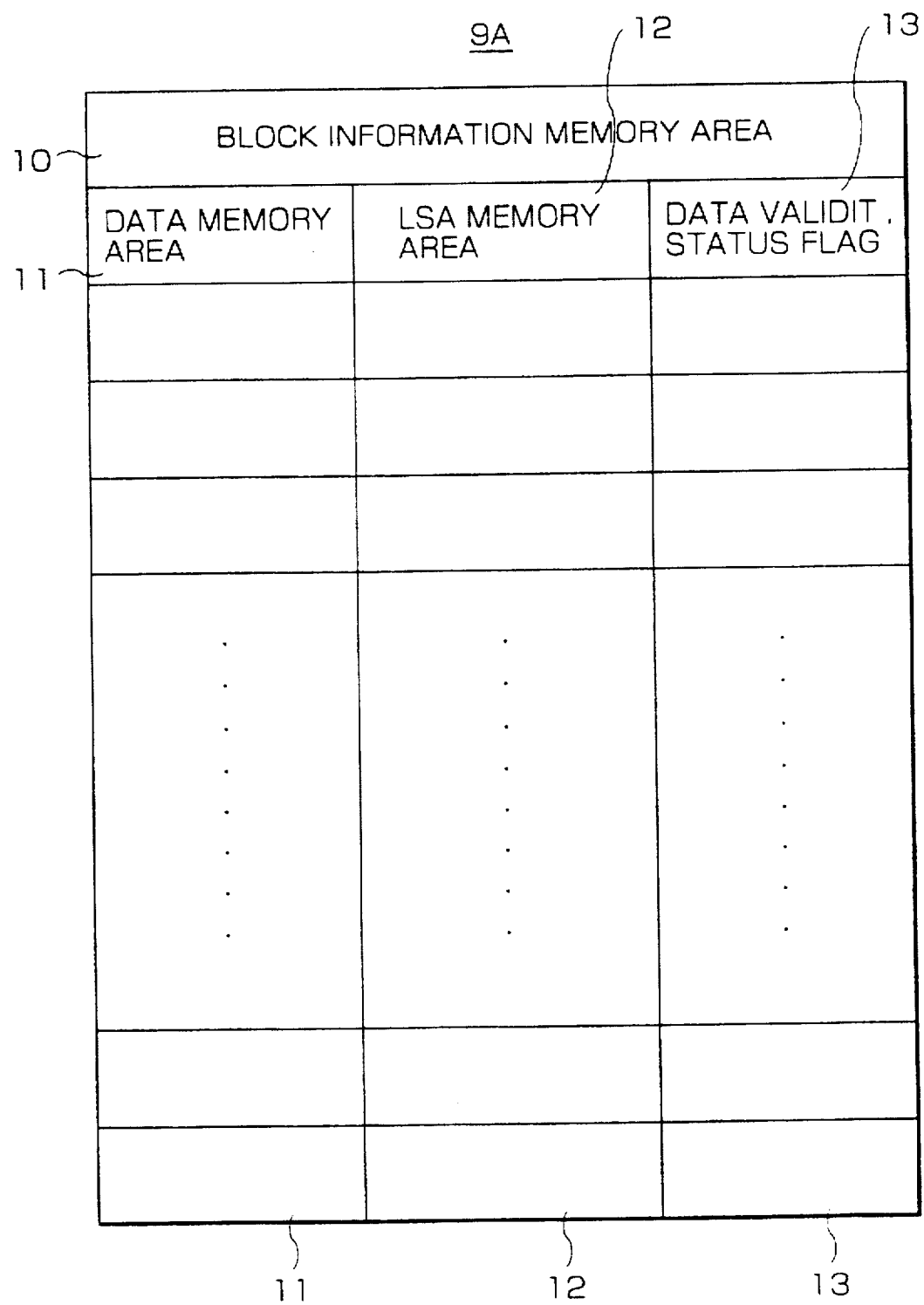
FIG. 4 shows the internal construction of the block according to the embodiment of the present invention.

An embodiment of the present invention is now discussed referring to FIGS. 1 through 4. FIG. 1 is the block diagram showing generally the construction of the embodiment of the present invention. FIG. 2 shows the internal construction of the address conversion table in the device of FIG. 1. FIG. 3 shows the internal construction of the block in the flash memory of FIG. 1 FIG. 4 shows the internal construction of the block information memory area of the block of FIG. 3. The identical or similar parts are designated by the same reference numerals throughout the figures.

In FIG. 1, the semiconductor disk device 2A of the embodiment comprises an interface circuit 3, CPU 4, an address conversion table 5A, a flash control circuit 6A, a data input/output sector buffer 7, and a flash memory 8A. The CPU 4 is constructed of MCU, ROM, RAM and I/O ports.

One difference from the prior art semiconductor disk device 2 is that the capacity of the address conversion table 5A is smaller and that the flash memory 8A is enlarged in capacity accordingly. In addition to the functions associated with the prior art flash control circuit 6, the flash control circuit 6A contains further the hardware for a logical sector address comparator circuit 61. Furthermore, CPU 4 performs memory management to the flash memory 8A using address pointers for read and write operations. Using the logical sector address comparator circuit 61 and address pointers, the semiconductor disk device 2A achieves reduction in the capacity of the address conversion table 5A while keeping substantially the same performance level as the prior art device. The access means in this embodiment is constituted by CPU 4 that uses address pointers for read and write operations, the flash control circuit 6A having the logical sector address comparator circuit 61, and the data input/output sector buffer 7.

The address conversion table 5A is a table used to convert a logical sector address LSA into a physical block number (PBN). A PBN is a block address of the flash memory 8A used in the semiconductor disk device 2A.

In FIG. 2, the address conversion table 5A is constructed of a logical sector address (LSA) storage section and a physical block number (PBN) storage section.

The LSA storage section stores the logical sector addresses. Their contents are fixed. In practice, when a logical sector address is sent from the host system 1, voltages are applied to the address pins of a volatile RAM, used as a conversion table, according to the LSA data, and the PBN data is then output. For convenience of explanation, it is presumed that the LSA storage section is arranged corresponding to the PBN storage section. The PBN storage section stores arbitrary physical block numbers for the flash memory 8A. The use of the address conversion table 5A allows data to be stored on the physical block that is convenient for internal data management, regardless of the logical sector specified by the host system 1. The address conversion table 5A is typically constructed of a volatile RAM such as an SRAM or DRAM, because it is frequently written and erased.

Unlike the prior art, only the PBN is determined from the LSA data in the address conversion table 5A. For example, suppose that a flash memory has a block size of 64 kilobytes. A block contains approximately 100 sectors (1 sector=512 bytes) (128 sectors without block information memory area 10 and the LSA memory area 12). For this reason, some technique is required to search for target data. Further discussion on this will be provided later.

The capacity of the address conversion table 5A is as follows. Assuming that a flash memory 8A of 20 megabytes is used and that one sector is 512 bytes, the number of sectors in the semiconductor disk device 2A is 40960 as in the prior art. Since the PBN storage section of the address conversion table 5A stores block numbers, the capacity of the address conversion table is reduced. Assuming that one block is 64 kilobytes, the number of blocks in the semiconductor disk device 2A is as follows:

Number of blocks in the semiconductor disk device=20 megabytes/64 kilobytes=320 blocks.

The number of bits to express 320 in binary is as follows:

ln 320/ln 2=8.3

To express 320, 9 bits are required. The necessary capacity of the address conversion table 5A is 40960×9=368640 bits. In conclusion, the necessary capacity is 45 kilobytes, which is a half the prior art counterpart.

In FIG. 3, the flash memory 8A is constructed of a plurality of blocks 9A and a plurality of backup blocks 9A. The size of the block 9A which is the object of memory management is the same as the unit of erase. The flash memory 8A used as the main memory is a flash memory of block-erase type as in the prior art (in this example the unit of erase block is 64 kilobytes).

In FIG. 4, a single block 9A comprises a block information memory area 10 on its header portion, a plurality of data memory areas 11, an LSA (logical sector address) memory area 12 associated with each data memory area 11, and a data validity status flag 13 associated with each data memory area 11. According to the data validity status flag 13, CPU 4 identifies data whether it is valid data or invalid data that waits for erasing. The valid data is indicated by "FF" (11111111) and the invalid data is indicated by "00" (00000000). These indications may be reversed between valid and invalid data. When the overwriting or erasing of data is performed, CPU 4 updates the data validity status flag 13 corresponding to the now unnecessary data memory area 11, from FF to 00.

Figure 7:
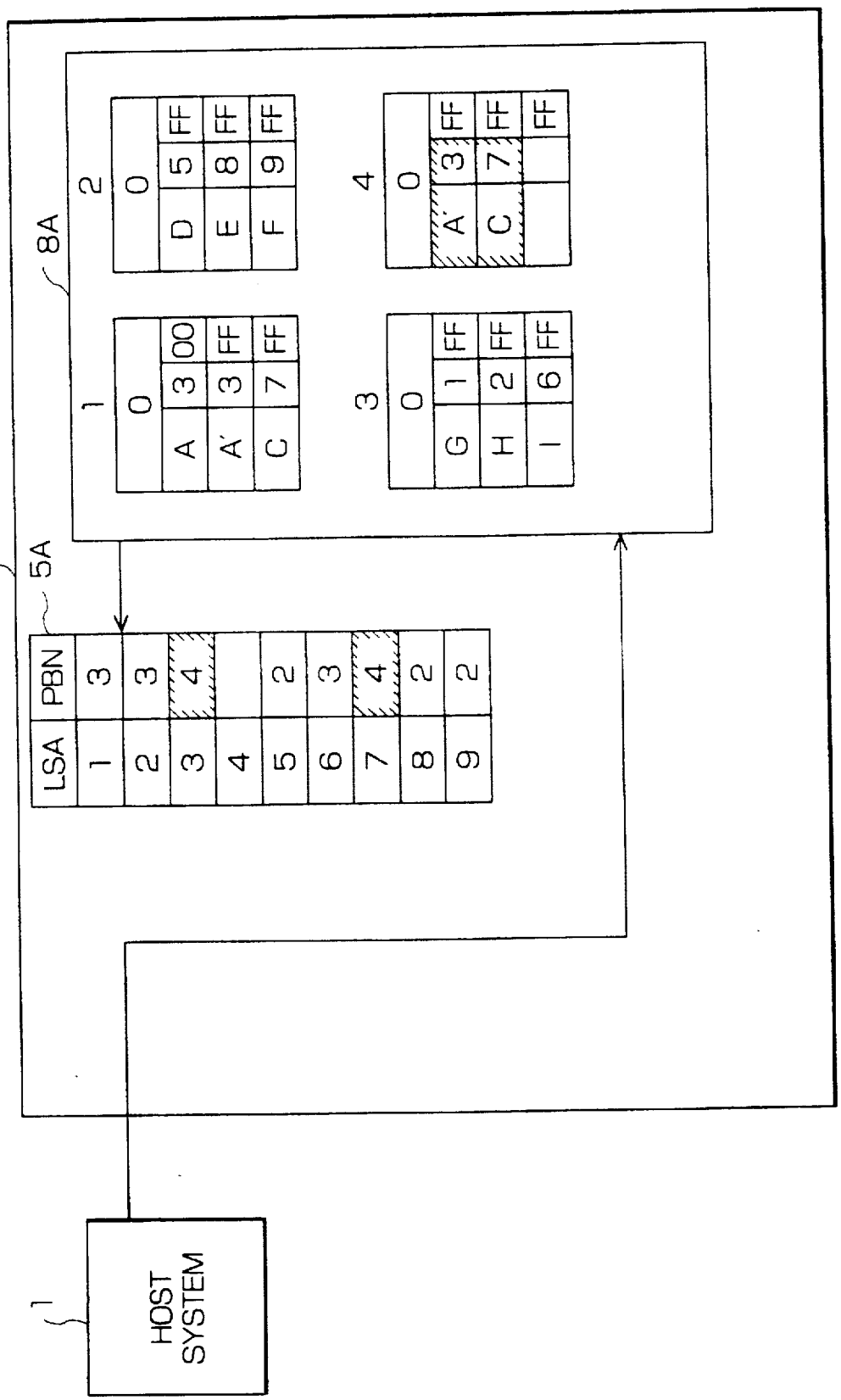
FIG. 7 shows the data write operation according to the embodiment of the present invention.
Figure 8:
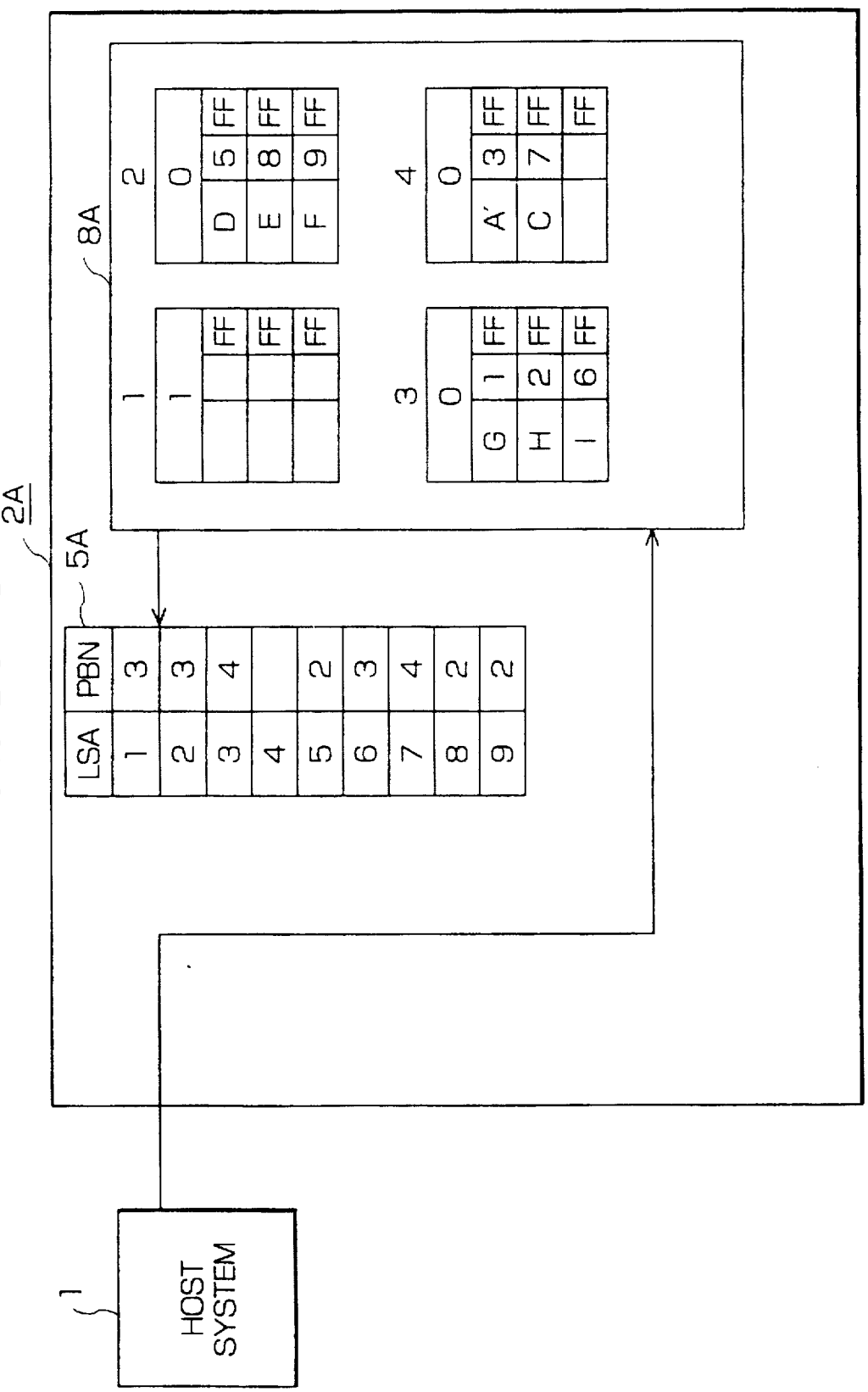
FIG. 8 shows the data write operation according to the embodiment of the present invention.
Figure 9:
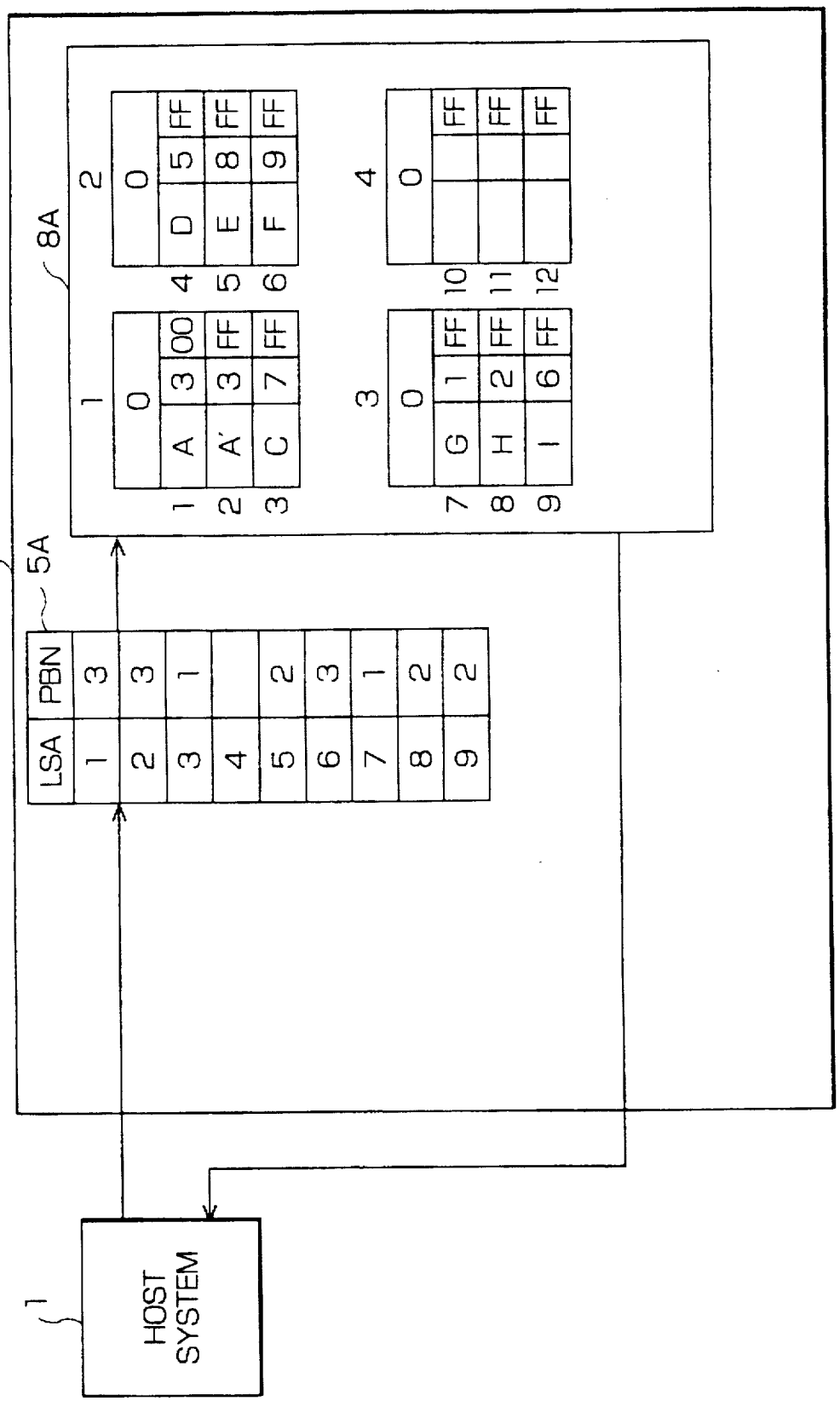
FIG. 9 shows the data read operation according to the embodiment of the present invention.
Figure 10:
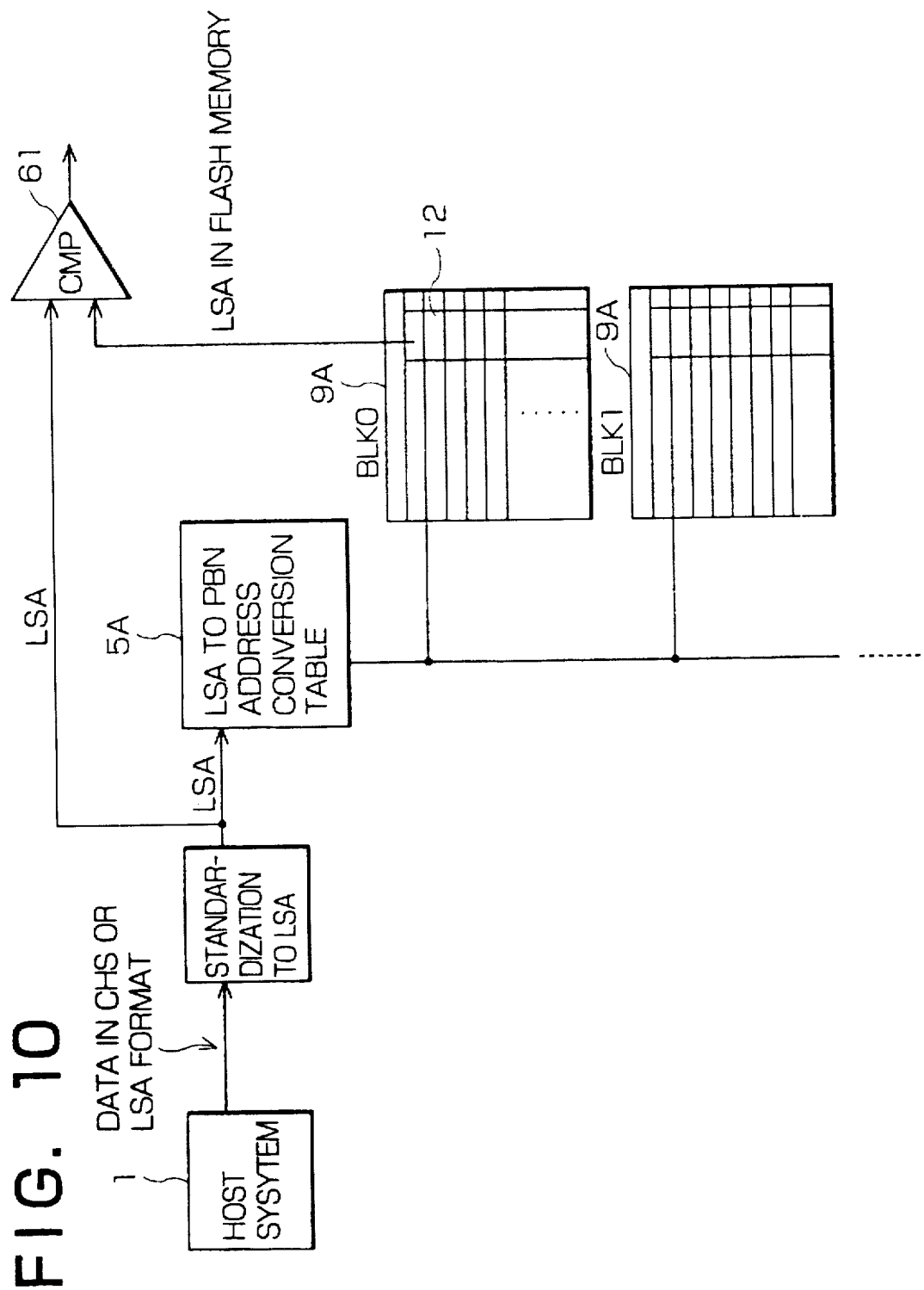
FIG. 10 shows the data read operation according to the embodiment of the present invention.
Figure 11:
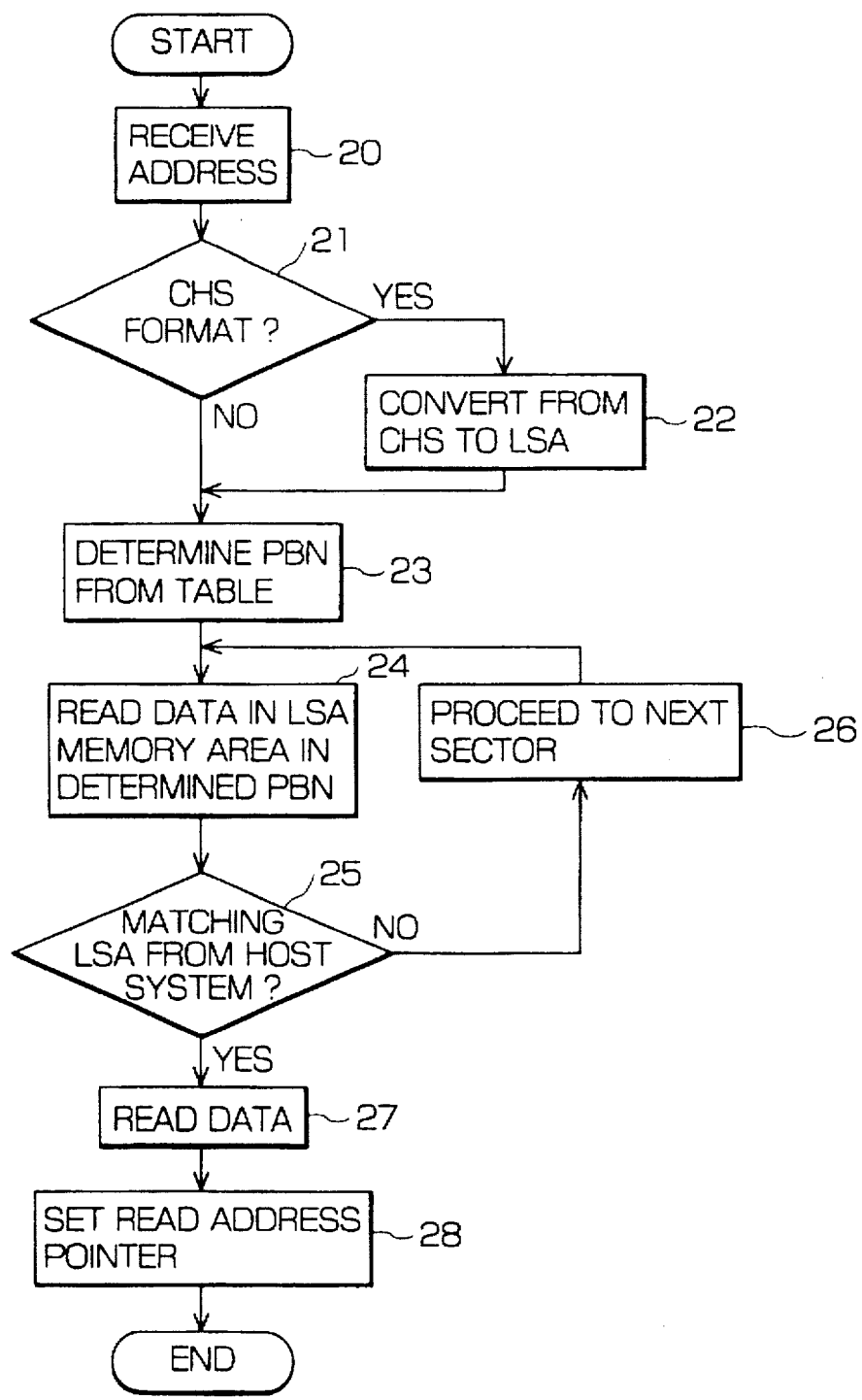
FIG. 11 is a flow diagram showing the data read operation according to the embodiment of the present invention.
Figure 12:
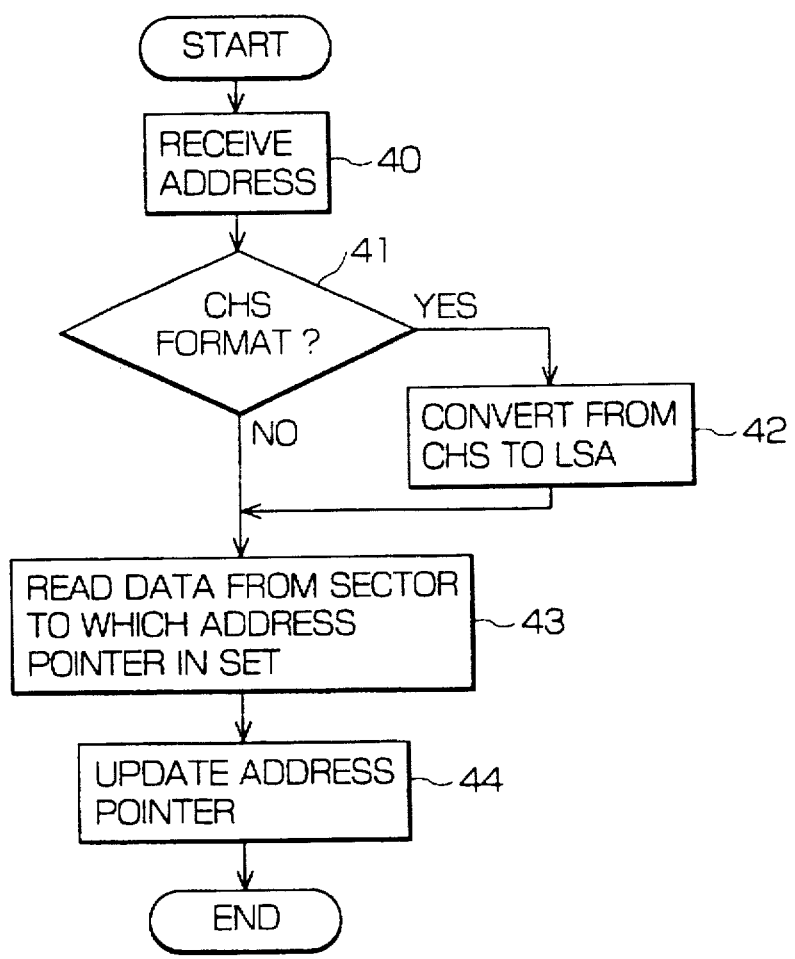
FIG. 12 is a flow diagram showing the data read operation according to the embodiment of the present invention.
Figure 13:
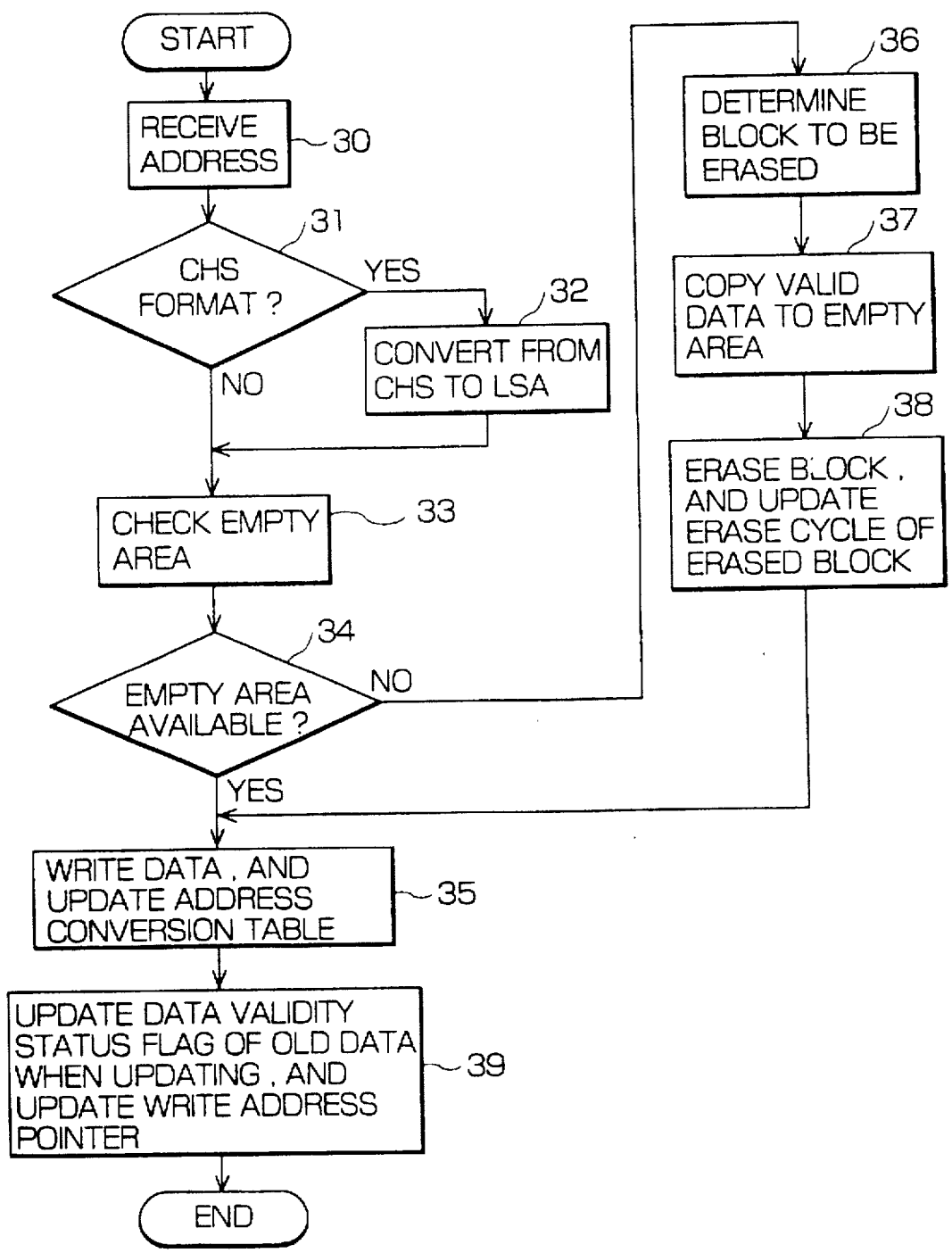
FIG. 13 is a flow diagram showing the data write operation according to the embodiment of the present invention.
Figure 14:
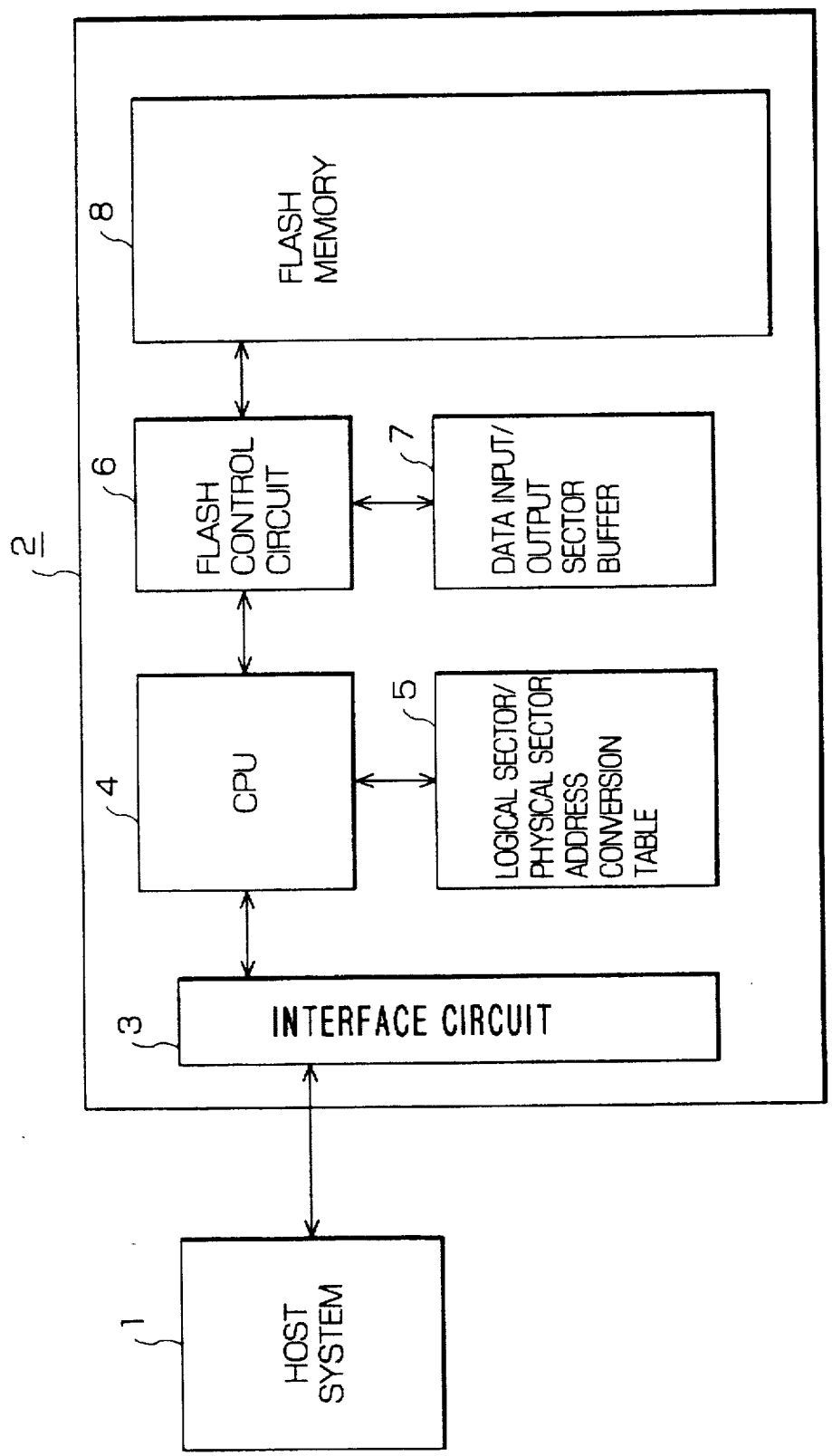
FIG. 14 is the block diagram showing-generally the prior art semiconductor disk device.
Figure 16:
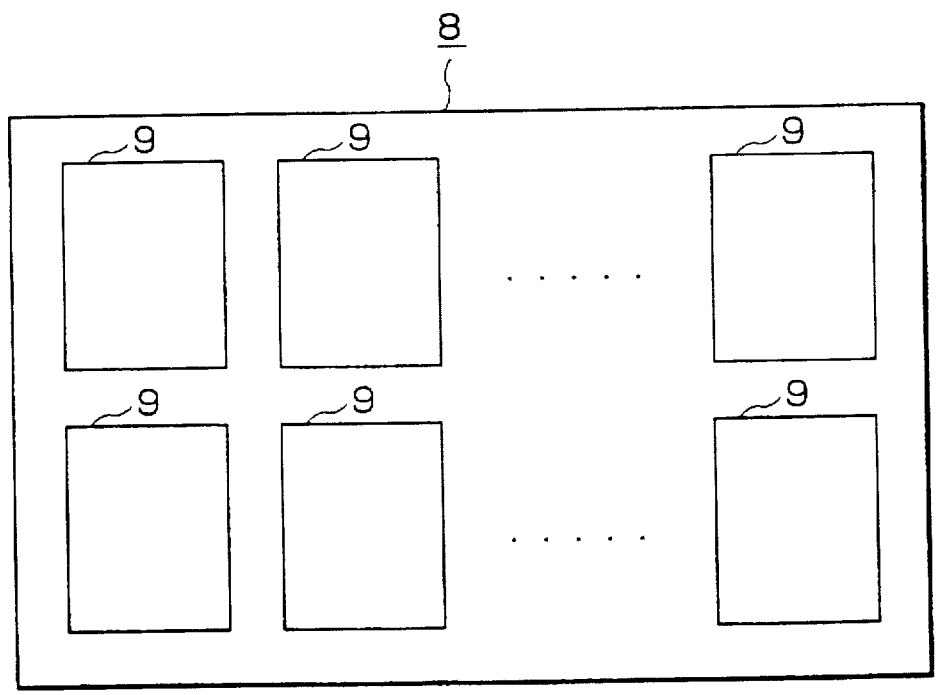
FIG. 16 shows the construction of the flash memory of the prior art semiconductor disk device.
Figure 17:
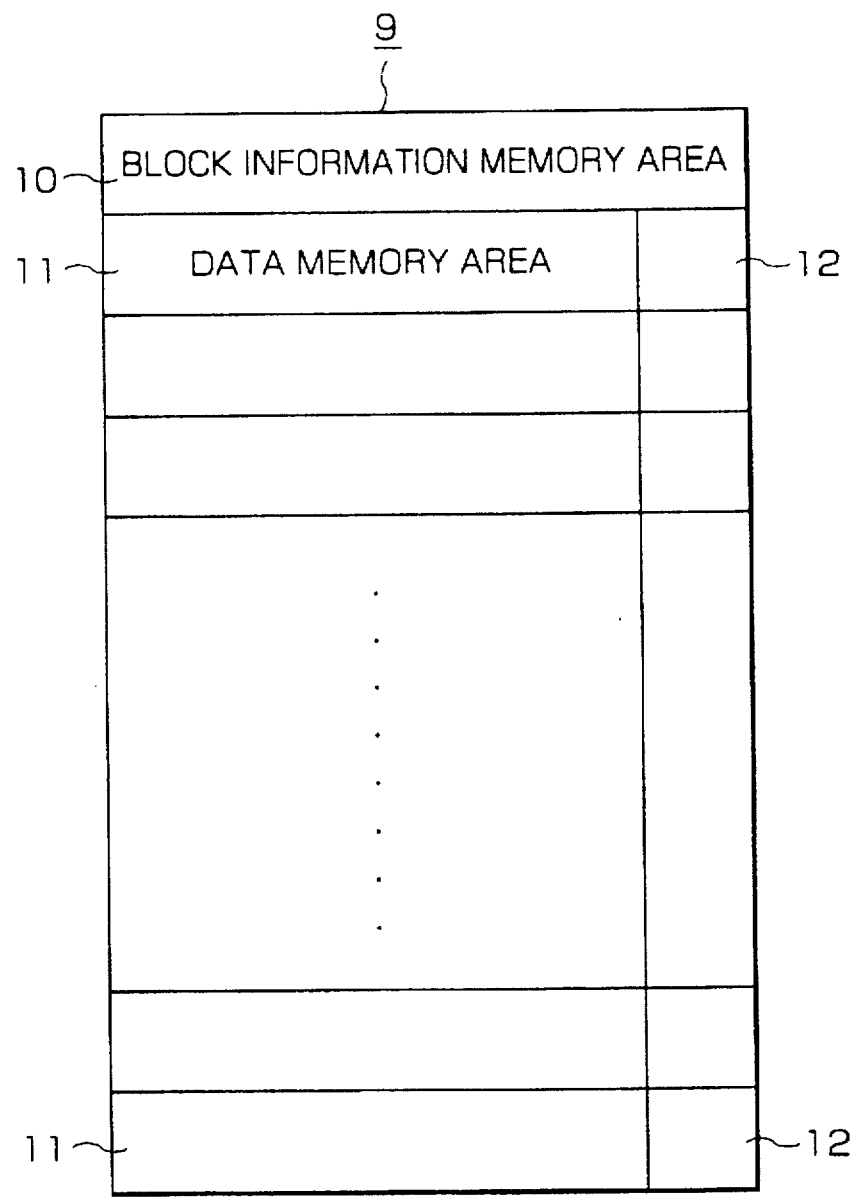
FIG. 17 shows the management block in the flash memory of the prior art semiconductor disk device.
Figure 18:
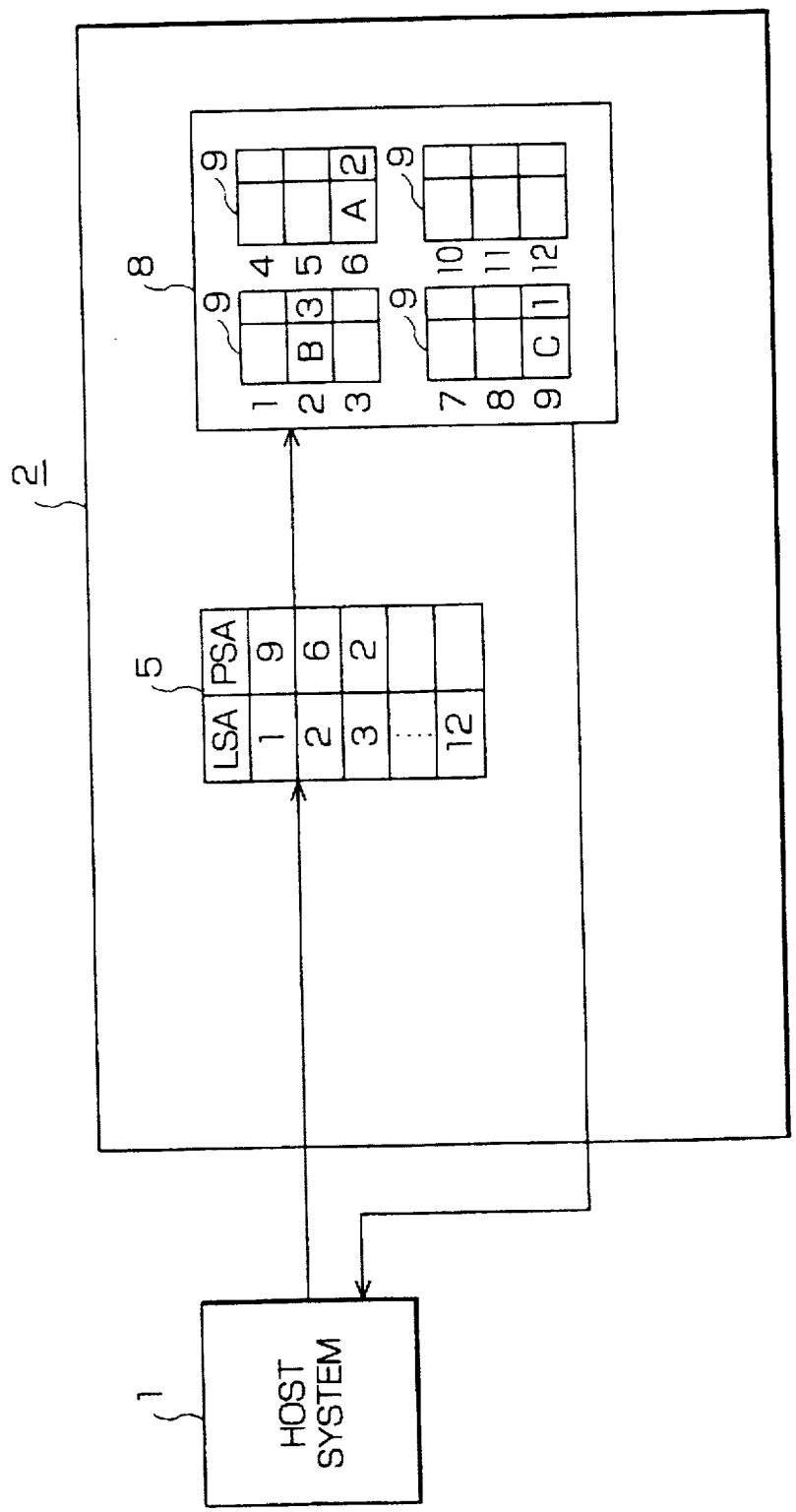
FIG. 18 shows the data read operation of the prior art semiconductor disk device.

The operation of the embodiment is now discussed referring to FIGS. 5 through 13. FIGS. 5 through 8 show the write operation of the embodiment. FIGS. 9 and 10 show the read operation of the embodiment. FIGS. 11 and 12 are flow diagrams showing the read operation of the embodiment. FIG. 13 is the flow diagram showing the write operation of the embodiment.

First, the write operation to the semiconductor disk device 2A is discussed referring to FIGS. 5 through 8. The difference from the prior art is that data is not written on a next block until all sectors (data memory areas) in one block are fully written. Furthermore, data is written continuously from top to bottom (rather than in a random manner). Using a write address pointer, the sector increments each time writing is completed. The address pointer herein is used to memorize the physical sector address (PSA). In this embodiment, each time data is read and written, a read address pointer and a write address pointer are used respectively.

The operation is discussed assuming that the flash memory 8A in the semiconductor disk device 2A initially contains no data at all. The write address pointer indicates "1". When writing data, the data to be written and the write address are sent from the host system 1. The address is converted anyway into the LSA format as in the prior art in the case the address is in the CHS format. Since the address format information is sent from the host system 1 together, the semiconductor disk device 2A can easily identify whether the address is in the CHS format or LSA format.

Figure 5:
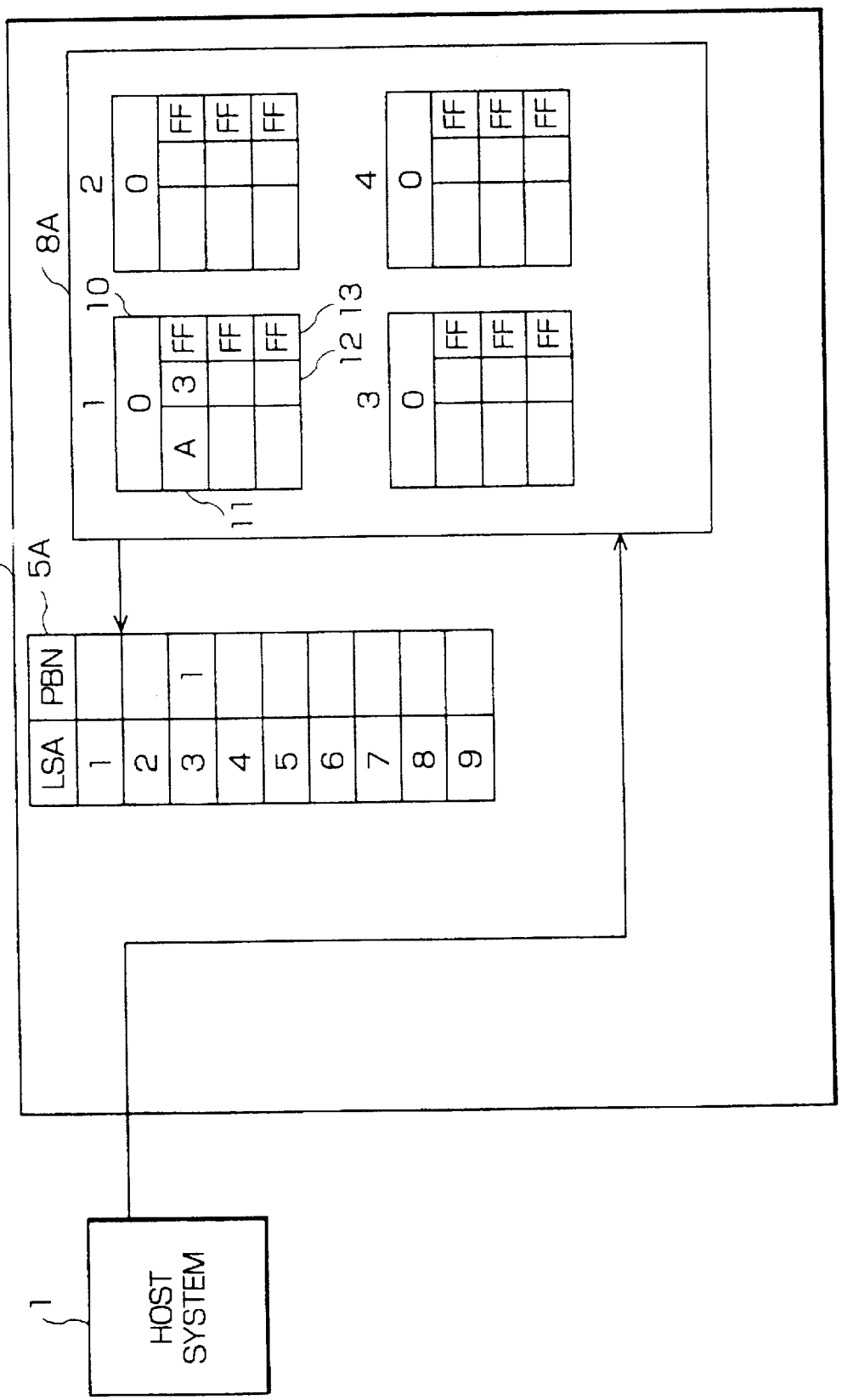
FIG. 5 shows the data write operation according to the embodiment of the present invention.

Even when the LSA comes in in a random manner as shown in FIG. 5, writing begins with PBN 1. For example, when the host system 1 requests that data A be written onto LSA 3, CPU 4 writes data A onto PBN 1 on the top of the data memory areas 11 using the write address pointer, and writes LSA 3 onto the corresponding LSA memory area. CPU 4 then increments the address pointer, namely updates the address pointer to 2. Furthermore, CPU 4 writes 1 onto the PBN of the address conversion table 5A corresponding to LSA 3. In FIGS. 5 through 9, the block 9A of the flash memory 8A is made up of three data memory areas 11 for convenience of explanation.

Figure 6:
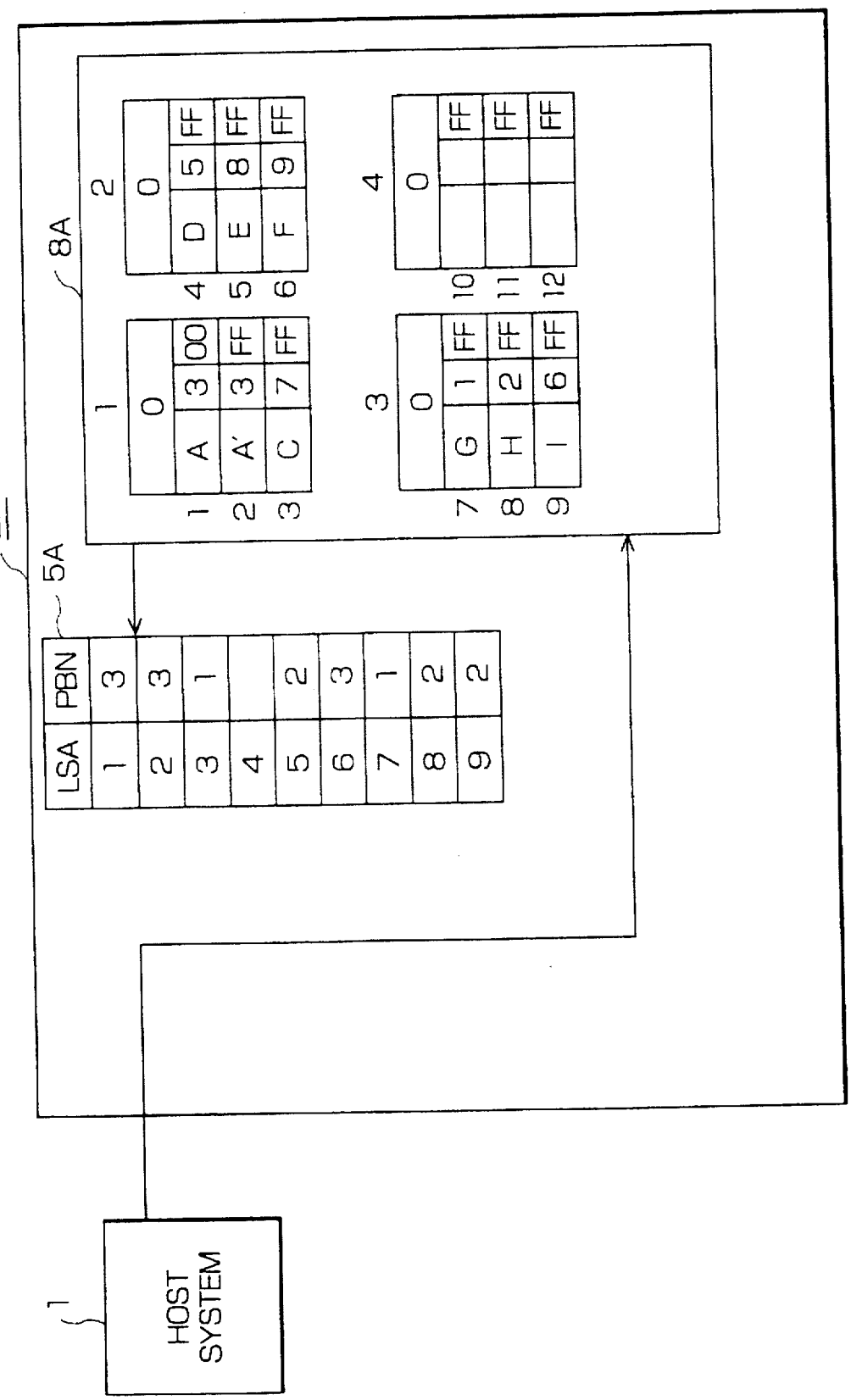
FIG. 6 shows the data write operation according to the embodiment of the present invention.

FIG. 6 shows the state in which only one clean block is available. In this case, the write address pointer has been incremented starting with 1 to 2→3→...→8→9 in that order, and now indicates 10 which is the top of the data memory area 11 of PBN 4. If the write operation continues, no further clean blocks are available in the flash memory 8A, and thus a block cleaning operation is performed.

CPU 4 checks all blocks to determine the blocks suitable for erasure. The suitable blocks are ones that are identified as having not many valid data according to the data validity status flags 13 or ones that have experienced a small number of erase cycles according to the block information memory areas 10. In FIG. 6, each block has the same erase cycle count of 0, and PBN 1 has less valid data. Data A' in PBN 1 means that data A is overwritten. Therefore, this block is erased to assure clean sectors.

As shown in FIG. 7, valid data is saved in PBN 4, and then the address conversion table 5A is updated. PBN 1 is then erased as shown in FIG. 8, and the number of erase cycles is incremented to 1. The above operation results in one clean block and one clean sector. The write address pointer now indicates 12.

Referring to FIGS. 9 and 10, the data read operation of the semiconductor disk device 2A is now discussed. The address sent from the host system 1 is first standardized to the LSA format. Next, the PBN is determined from the LSA referring to the address conversion table 5A.

LSAs in the LSA memory areas 12 belonging to the obtained PBN are checked from bottom up. As shown in FIG. 10, in this case, the logical sector address comparator circuit 61 in the flash control circuit 6A compares the LSA sent from the host system 1 with the LSA stored in the LSA memory areas 12 of the PBN. The content of the data memory area 11 (sector) that gives a match is the data to be read. The PSA, which has given the match, plus 1 are set as the read address pointer. When the data to be read is in a plurality of sectors, data is read from the sector address the read address pointer indicates in the next read operation.

For example, when the host system 1 sends data of LSA 2, the address conversion table 5A gives PBN 3 as shown in FIG. 9. Next, the logical sector addresses in PBN 3 are checked sequentially from bottom up. Since the bottom-most LSA is 6, no match is found. The next LSA is 2, and this matches the incoming LSA. Therefore, data to be read is H. In this case, the read address pointer is 9.

Unlike the prior art, the larger the block, the longer time each search takes in this embodiment. Generally speaking, however, much data is greater than 512 bytes 1 sector) in size. A first data search may require 100 steps of search at maximum, because a single block contains data areas of approximately 100 sectors. For a second data search onward, there is a high possibility that the data is stored in the sector that is next to the sector previously read. Therefore, by storing the address of the sector next to the sector previously read as the read address pointer, the number of search steps is substantially reduced.

The data read operation of the semiconductor disk device 2A is discussed referring to flow diagrams in FIGS. 11 and 12. When handling a file (data) consisting of one to tens of sectors, the read address pointer is undetermined in reading the header sector of the file, and the search process in FIG. 11 is thus performed. When the next sector of data of the file is read, the process in FIG. 12 is performed because the read address pointer has already been set. The difference from the process in FIG. 11 is that in the process in FIG. 12 CPU 4 reads the data without using the LSA though CPU 4 receives from the host system 1 the address (LSA) of the data to be read. The search process in FIG. 11 is performed when the read address pointer reaches the final sector address in the block as well as when the header sector of the data in the file is read. This is because the block in which the sector to be read next exists is not known. According to the file name or the like, CPU 4 discriminates between the header of the file and the rest of the file, and determines the final sector address referring to the block size and the like.

First, the sector information about the data to be read is received from the host system 1 (step 20). The sector information is sent in either the LSA format or CHS format. To standardize to the LSA format, the information, if in the CHS format data, is converted to LSA format data (steps 21 and 22). This conversion may be performed by CPU 4 in the semiconductor disk device 2A or by a dedicated circuit inside the semiconductor disk device 2A.

Next, the LSA is converted into the PBN (step 23). The address conversion table 5A is used for this operation. Next, an LSA stored in one of the LSA memory areas 11 in the obtained PBN is read. The read LSA is compared with the LSA from the host system 1 by the LSA comparator circuit 61. If no match results, the LSA stored in the next LSA memory area 12 is read, and compared with the LSA from the host system 1. This operation is repeated from bottom up in the PBN until a match is obtained. The direction of search may be top down rather than bottom up (steps 24 through 26).

When both LSAs agree, the data in the corresponding data memory area 11 is read (step 27). The next sector address in succession to the sector address from which the data has been read is set into the read address pointer (step 28).

The data of the next sector address is read as follows. Steps 40 through 42 are identical to steps 20 through 22, respectively. To assure compatibility of the interface, the data received from the host system 1 needs to be standardized to the LSA format.

The data from the sector address indicated by the read address pointer is read (step 43), and the read address pointer is incremented. When reading a file in the prior art semiconductor disk device, the number of references to the address conversion table 5 agrees with the number of sectors that makes up the file. Although, in this embodiment, the first data search in a block takes time, the subsequent search thereafter is processed faster than the prior art device.

To increase the reliability of data reading at the expense of the read rate, the LSA received from the host system 1 is compared with the LSA in the LSA memory area 12 indicated by the read address pointer following step 43. If no match results, the search process starting at step 23 is performed.

The operation of writing data to the semiconductor disk device 2A is now discussed referring to FIG. 13. Steps 30 through 32 in FIG. 13 are identical to steps 20 through 22 in FIG. 11, and their explanation will not be repeated. Empty sectors are checked according to the write address pointer (step 33).

When an empty sector is found, data is written there and the address conversion table 5A is updated (steps 34 and 35). Namely, the PNB on which data is written is stored in the PNB storage section corresponding to the LSA.

When no empty sector is found according to the write address pointer at step 34, the process proceeds as follows (steps 36 through 38). Which block to erase is determined based on the number of erase cycles and the amount of invalid data. Valid data there is copied to an empty block. The block to be erased is erased, and the number of erase cycles at the erased block is incremented. The process goes to step 35.

When data is updated, the data validity status flag 13 of the old data is changed from FF to 00. The write address pointer is updated (step 39). In this embodiment, data is continuously written, and the write address pointer indicates the subsequent sector address when data writing is completed. When all sectors in the block are full of data, CPU 4 determines the sector address that indicates the block to be written next. For example, if a plurality of empty (clean) blocks exists, CPU 4 selects one empty block to be written next, referring to the number of erase cycles and the like.

At no expense of performance such as read rate in the prior art semiconductor disk device (card), this embodiment achieves a reduction in the capacity of the address conversion table 5A by using the read and write address pointers and the logical sector address comparator circuit 61. By reducing the capacity of the address conversion table 5A, the capacity of the semiconductor disk card is enlarged without any difficulty. In the prior art, a semiconductor disk device of 20 megabytes requires an address conversion table 5 of 80 kilobytes, and a semiconductor disk device of 40 megabytes requires an address conversion table 5 of 160 kilobytes (1.25 megabits). Reduction to half these sizes reduces the cost for volatile RAMs. Extra flash memories may be installed in the space where the address conversion table volatile RAM memory used to be mounted, and a larger capacity semiconductor disk device results.

What is claimed is:

1. A semiconductor disk device comprising:
a non-volatile, electronically programmable and erasable flash memory including a plurality of blocks, each block having a plurality of sectors and being a unit of erasure for the flash memory;
interface means for exchanging data and addresses with an external system;
an address conversion table for converting sector address information input from the external system into a physical block number for identifying a block of the plurality of blocks; and
means for converting the sector address information input from the external system into the physical block number, by referring to the address conversion table, and for accessing the flash memory according to the physical block number.

2. The semiconductor disk device according to claim 1, wherein the sector address information includes a logical sector address.

3. The semiconductor disk device according to claim 2, wherein said address conversion table includes a logical sector address storage section and a physical block number storage section.

4. The semiconductor disk device according to claim 1 wherein each of the blocks comprises at least about 100 sectors.

5. The semiconductor disk device according to claim 4, wherein each of the plurality of includes blocks a block information memory area for storing a number of erase cycles of the block, a plurality of data memory areas for storing data, a logical sector address memory area associated with each of the data memory areas for storing a logical sector address, and a data validity status flag associated with each of the data memory areas for indicating whether the data is valid.

6. The semiconductor disk device according to claim 5, wherein the means for converting includes an address pointer that stores a physical sector address for accessing a sector within a block and accesses the flash memory based on the physical block number into which the logical sector address input from the external system is converted according to the address conversion table and the address pointer.

7. The semiconductor disk device according to claim 6, wherein the address pointer is a write address pointer, and said means for converting writes data input from the external system into the data memory areas from top down in the block according to the physical sector address stored by the write address pointer, writes the logical sector address input from the external system into the logical sector address memory area corresponding to the data memory area where the data is written, and writes the physical block number into the physical block number storage section corresponding to the logical sector address in the address conversion table.

8. The semiconductor disk device according to claim 7, wherein when updating old data having a first logical sector address and a data validity status flag with new data having the first logical sector address, the means for converting writes the new data into an empty data memory area and sets the data validity status flag of the old data to an invalid state.

9. The semiconductor disk device according to claim 7, wherein when no empty data memory areas are available in the block, said means for converting searches an empty block and writes data into a data memory area in the empty block.

10. The semiconductor disk device according to claim 9, wherein when no empty block areas are available, the mean for converting determines a block to be erased based on the number of invalid data validity status flags of each block.

11. The semiconductor disk device according to claim 9, wherein when no empty block areas are available, the means for converting determines a block of plularity of blocks to be erased based on the number of erase cycles previously applied to each block.

12. The semiconductor disk device according to claim 9, wherein when no empty block areas are available, the means for converting determines a block to be erased based on the number of invalid data validity status flags and the number of erase cycles previously applied to each block.

13. The semiconductor disk device according to claim 6, wherein the address pointer is a read address pointer, and the means for converting searches the logical address memory areas from bottom up or from top down in the block according to a physical sector address specified by the read address pointer, and reads the data stored in the data memory area when the logical sector address input from the external system matches the logical sector address stored in the logical sector address memory area.

14. The semiconductor disk device according to claim 6, wherein the address pointer includes a read address pointer and the means for converting reads the data stored in the data memory area in the block according to a physical sector address specified by the read address pointer.

15. The semiconductor disk device according to claim 13, wherein when reading of more than one sector of data is requested by the external system, reading is accelerated by sequential reading, without reference to the address conversion table, by incrementing the read address pointer after an initial sector of the plurality of sectors has been found, until the logical sector address input from the external system no longer matches a logical sector address stored in the logical sector address memory area for a sector being read, or the end of the block is reached, whereupon a full search process including reference to the address conversion table is resumed.

16. The semiconductor disk device according to claim 13, wherein as long as a search for a sector to be read is within the block from which an immediately preceding sector was read, and the external system indicates that the data is not contiguous, then a search for valid data starts from a location immediately following a location of the immediately preceding sector, after which the block is circularly searched until the logical sector address stored in the logical sector address memory area matching the logical sector address input from the external system is found.

* * * * *

UNITED STATES PATENT AND TRADEMARK OFFICE
CERTIFICATE OF CORRECTION

PATENT NO. : 5,740,396
DATED : April 14, 1998
INVENTOR(S) : Mason

It is certified that error appears in the above-identified patent and that said Letters Patent is hereby corrected as shown below:

Column 10, Line 15, change "includes blocks" to

--blocks includes--.

Signed and Sealed this

First Day of September, 1998

BRUCE LEHMAN

Attest:

*Attesting Officer*

*Commissioner of Patents and Trademarks*